United States Patent [19]

Young

[11] 3,864,282
[45] Feb. 4, 1975

[54] ZEOLITIC POROUS REFRACTORY OXIDE PARTICLES

[75] Inventor: Dean Arthur Young, Yorba Linda, Calif.

[73] Assignee: Union Oil Company of California, Los Angeles, Calif.

[22] Filed: Jan. 8, 1973

[21] Appl. No.: 321,749

[52] U.S. Cl. .............................................. 252/455 Z
[51] Int. Cl. .............................................. B01j 11/40
[58] Field of Search .............................. 252/455 Z

[56] References Cited
UNITED STATES PATENTS

| | | | |
|---|---|---|---|
| 3,558,525 | 1/1971 | Noble | 252/455 Z |
| 3,595,611 | 7/1971 | McDaniel et al. | 252/455 Z |
| 3,652,459 | 3/1972 | Parthasarathy et al. | 252/455 Z |
| 3,676,368 | 7/1972 | Scherzer et al. | 252/455 Z |

*Primary Examiner*—C. Dees
*Attorney, Agent, or Firm*—Lannas S. Henderson; Richard C. Hartman; Michael H. Laird

[57] ABSTRACT

Refractory oxide particles having average diameters below 1,000 A are prepared by very rapid heating at rates in excess of 1°F per millisecond to temperatures in excess of about 1,000°F. The particles should be heated through a temperature differential of at least about 500°F. Zeolites having extremely small crystal sizes can be made by this procedure.

6 Claims, 1 Drawing Figure

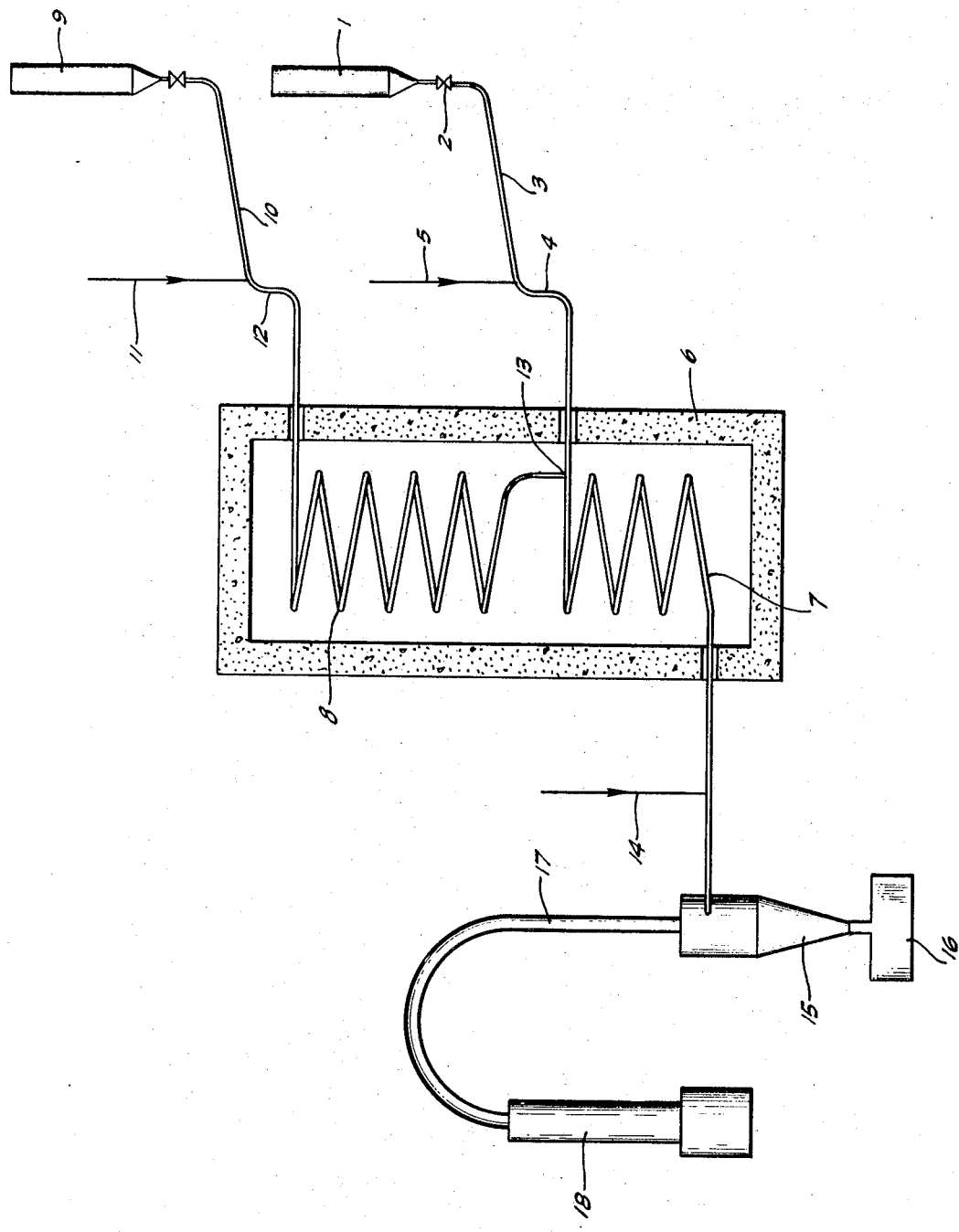

ZEOLITIC POROUS REFRACTORY OXIDE PARTICLES

BACKGROUND

Crystalline and amorphous refractory oxides are employed in numerous processes as adsorbents, ion exchange agents, catalyst supports and the like. Many of these processes benefit by reducing the size of the refractory oxide particles. Reducing particle diameter serves to increase external surface area and improve accessibility to the interior of the particle. Furthermore, in catalytic reactions it may be desirable to reduce reactant residence time within a particle. For example, excessive cracking may result if hydrocarbons are trapped within a catalyst particle with the result that the zeolite becomes fouled with carbon and a part of the feed is over converted to unusuable or undersirable products. The possibility of trapping reactants or products within the particle can be reduced by reducing particle size.

Previous efforts to produce adsorbents on catalysts of very small particle size have concentrated primarily on physical methods such as grinding. These procedures are timeconsuming and are not usually sufficient to produce particles having diameters less than 100 millimicrons. Although several chemical methods have been investigated these are usually complicated and are very sensitive to minor variations in reaction conditions. For example, a chemical method for producing crystalline zeolites having particle sizes between 10 and 100 millimicrons is described in U.S. Pat. No. 3,516,786. This procedure involves the formation of a faujasite zeolite in the presence of an organic solvent under controlled conditions such that small crystallites are obtained.

I have now discovered that refractory oxide particles can be converted to very small particles by a relatively uncomplicated procuedure.

It is therefore one object of this invention to provide a method for reducing the size of refractory oxide particles. Another objective is provision of an improved method for producing amorphous or crystalline refractory oxides of very small particle diameters. Yet another object is the provision of an improved method for thermally treating refractory oxides. Yet another object is the provision of a method for producing crystalline zeoliets having extremely small crystalliet sizes.

In accordance with one embodiment of this invention a particulate refractory oxide having a surface area of at least about 100 square meters per gram and an average particle diameter in excess ob about 1,000 A. is heated to a temperature in excess of 1000°F through a temperature differential of at least 500°F at a rate of at least 1°F per millisecond sufficient to reduce the average particle size of the oxide to less than 1000 A.

The refractory oxides can be either crystalline or amorphous and should be relatively porous materials. These oxides usually have surface areas in excess of about 100 preferably above about 200 square meters per gram. The pore volume of the starting material will usually exceed about 0.2 cc per gram. The particle size of the starting material is not critical since either large or small particles can be treated by these methods. As a general rule original particle diameters will exceed about 1000 A. In a preferred embodiment involving fluidized calcination, particle size is usually below about 400 and preferably below about 100 microns.

The oxide can be relatively dry or may contain substantial amounts of volatile matter. Volatile components include chemisorbed and physisorbed water, hydroxyl groups, and volatile ions such as ammonium ion. For the purpose of this invention, volatile contents can be determined by measuring weight loss occurring upon heating at 1,000°F for 2 hours. Oxides having volatile contents of at least about 3 and preferably at least about 5 weight percent are preferred.

A variety of oxides can be used. Illustrative of these are silica, alumina, magnesia, beryllia, zirconia and the like, and natural or synthetic crystalline or amorphous combinations thereof. These include cogels of alumina, silica and/or the metal oxides of Periodic Groups II–B, III, IV such as silicazirconia, silica-magnesia, alumina-thoria, etc., and the siliceous clays such as halloysite, kaolin, montmorillonite, bentonite, and micaceous clays, exemplified by glauconite, vermiculite, illite, and the like. Exemplary crystalline aluminosilicates include zeolite X, U.S. Pat. No. 2,882,244; zeolite Y, U.S. Pat. No. 3,130,007; zeolite A, U.S. Pat. No. 3,882,243; zeolite L, Belgium 575,117; zeolite T, U.S. Pat. No. 2,950,952; Omega zeolite, Canadian 817,915; and the like.

Various modified forms of the crystalline or amorphous oxides can also be employed. These include ion exchanged or acid or thermally treated amorphous oxides or zeolites such as the faujasite zeolite Y described in the U.S. Pat. No. 3,293,192; and the acid treated oxides discussed in U.S. Pat. Nos. 3,446,727; 2,935,463 and 2,410,436.

Preferred oxides include the crystalline aluminosilicate zeolites, particularly zeolites X, Y, L, T, A, Omega and the so-called layered aluminosilicates including physically and chemically modified forms thereof. The preferred zeolites contain less than about 5, preferably less than 3 weight-percent alkali metal determined as the corresponding oxide. Alkali metal content can be easily reduced by ion exchange with a solution of an ionizable salt having a cation capable of replacing the alkali metal, e.g., sodium or potassium. Preferred cations include hydrogen, hydrogen precursor ions and polyvalent metal cations such as chromium, the rare earth elements of the actinide and lanthanide series, the iron group metals, e.g., iron, cobalt and nickel, and the like.

Hydrogen ion can be indroduced directly into the zeolite by exchange with organic or inorganic acids. Care should be taken in this procedure to avoid destruction of the ziolite. Hydrogen precursor ions are herein considered to be those which are thermally convertible to hydrogen or the decationized form of zeolite at elevated temperatures, e.g., above about 500°F. The most common hydrogen precursor ion is ammonium ion which can be introduced by exchange with an aqueous solution of ammonium salts such as the chloride, sulfate, nitrate and the like. Numerous other hydrogen precursors can be used. These include organic and inorganic ammonium salts such as ammonium halides, ammonium carbonates, ammonium thiocynates, ammonium hydroxide, ammonium molybdate, ammonium dithionate, ammonium nitrate, ammonium sulfate, ammonium formate, ammonium lactate, ammonium tartrate, and the like. Other suitable exchange compounds include the class or organic nitrogen bases such as pyridine, guanidine, and quinoline salts and the complex polyhydrocarbyl ammonium salts such as tetraalkyl and tetraaryl salts, e.g. trimethylammoniumhydroxide and tetraethylammonium hydroxide.

The oxide should be heated to a temperature of at least about 1,000°F, preferably at least about 1,400°F through a temperature gradient of at least about 500°F, preferably at least 1,000°F. Heating rates should exceed 0.1°F per millisecond, preferably at least 1 or even 5°F or more per millisecond. More pronounced changes are obtained at even higher rates on the order of 10, 50, 100, or more degrees per millisecond.

Although these heating rates are relatively extreme they can be achieved by several methods of which fluidized heating is presently preferred. This procedure can be better understood by reference to the drawing which is a schematic illustration of one embodiment of this invention.

Referring now to the drawing the oxide powder contained in a suitable dispensing funnel 1 is metered by valve 2 through inclined line 3 into admixture with fluidizing air entering the system by way of line 5. Line 3 is preferably vibrated to induce flow of the particulate oxide. The fluidizing air picks up the oxide particles in the more vertical section of pipe 4 and sweeps the particles into furnace 6 and through calcination coil 7.

As illustrated in this embodiment, a thermally stable material such as dense sand or other stable refractory of high density is passed from container 9 through inclined line 10 into admixture with fluidizing air entering through pipe 11 which picks up the stable refractory section 12 and passes it through pre-heat coil 8. The stable refractory should be more dense than the treated oxide to facilitate separation. For this reason its density should be at least 10 and preferably 30 percent greater than that of the oxide. This material can also have a larger particle size on the order of 10 microns, preferably 50 microns or more, which, also facilitates separation from the treated oxide.

The preheated stable refractory is rapidly mixed with the sample refractory oxide at junction 13 where the two streams converge. This point of convergence is preferably at a right angle to promote turbulence and rapid mixing. The combined streams are then swept through calcination coil 7 wherein the above described heating rates are obtained. The materials then exit the furnace and are quenched by an inert gas entering by way of line 14. The quenching step is not essential although it is presently preferred. Quench temperatures are usually below 500°F, preferably below 300°F.

The product is passed to cyclone 15 from which the more dense stable refractory particles are accumulated in receiver 16, the lighter refractory product being carried overhead with the exhaust gas through conduit 17. The fine product particles are removed from the exhaust gas in bag filter 18.

The size of preheater 8 relative to calcination coil 7 and the respective flow rates should be determined in relation to the minimum velocity required to carry the particles through the coil, the ultimate temperature required in calcination coil 7, the rate of temperature increase desired at mixing point 13 and residence time. The rate of air flow through both coils should also be correlated for the same reasons. However, a wide range of gas flow rates can be employed to obtain the above described heating rates and temperatures. For example, the volume ratio of the gas flow rate through coil 8 to the rate of refractory oxide fed through line 3 will usually be between about 10 and about 100 standard cubic feet per pound.

Although it is usually most convenient to employ air as the preheating and fluidizing gases in both coils, a variety of gases can be used for that purpose. These include carbon dioxide, nitrogen, hydrogen, steam, nitrogen dioxide, and the like. Furthermore, the use of a stable heat conveying refractory such as sand is not essential in all embodiments. For example, a stream of air, steam or other gas or combination of gases can be passed through the pre-heat coil 8 in the absence of any solid stable refractory so as to heat the gas and thereby rapidly heat the refractory oxide entering by line 3 when the two are mixed at juncture 13. However, more rapid heating rates can be obtained by the use of heat conveying stable refractories as above described.

The products resulting from this process have average particle sizes below about 1,000 A, preferably below about 500 A. The preferred materials, i.e., the aluminosilicate zeolites, usually have crystallite sizes below about 500 A and surface areas in excess of 400 square meters per gram.

The severity of thermal shock required to reduce particle and/or crystallite size depends in part on the stability of the refractory to such treatment. Accordingly, the optimum heating rates and temperatures in calcination coil 7 will vary with the properties of the feed. These characteristics can be easily ascertained by passing the oxide through the coil under several different conditions, determining the extent of particle size reduction obtained and then selecting the conditions most preferred for that material.

The rate of heating in coil 7 can be determined by the transfer characteristics of the coil, coil length, furnace temperature, mass flow rate, the relative mass flow rates of material through preheat coil 8 and calcination coil 7, and the temperature of the heating gas upon exiting coil 8 at junction 13. Thus, one or more of these variables can be changed to modify both heating rate and ultimate temperature in coil 7 and thereby control the severity of thermal treatment.

EXAMPLE 1

An ammonium zeolite Y having a silica-to-alumina ratio of about 4.5 and containing 1.6 weight percent $Na_2O$ was exchanged with cobalt nitrate until the cobalt content was 5.7 percent CoO. The product was dried 16 hours at 220°F. The zeolite had a crystal size of 2,900 A determined by the broadening of the X-ray diffraction line due to the (533) spacing. This corresponds to an external crystal surface area of 9.4 square meters per gram assuming an ideal cube. The total surface area determined by nitrogen adsorption at 0.019 relative pressure was 854 square meters per gram. The total volatiles content of the starting material was about 15 weight percent including water and ammonium ion.

EXAMPLE 2

The cobalt Y zeolite prepared in Example 1 was placed in a preheated muffle furnace, heated to 1,500°F in approximately 15 minutes, and was retained at that temperature for 16 hours. The product had a crystal size of 2,900 A, a relative crystallinity of 80 percent compared to the ammonium zeolite of Example 1, and a surface area of 792 square meters per gram.

EXAMPLE 3

A portion of the cobalt zeolite Y described in Example 1 was calcined in the apparatus illustrated in FIG. 1 at 1,575°F. The calcination coil was a 20 foot stainless steel tube having an inside diameter of 0.305 inches. The zeolite was fed to the coil at a rate of 4.0 pounds per hour with a sweep air rate of 5.7 pounds per hour. The dimensions of the preheat coil were identical to those described for the calcination coil. Water was fed to the preheat coil at a rate of 0.84 pounds per hour. No air was added to the preheat coil. The combined stream exiting the calcination coil was quenched to a temperature below 300°F by ambient air injection.

X-ray spectra indicated that the zeolite retained 53 percent of its original crystallinity. The crystal size had been reduced to 390 A. This corresponds to an external crystal surface area of 70 square meters per gram assuming cubic crystal form. The total surface area was 728 square meters per gram. Thus, even though the zeolite had lost substantial crystallinity, the corresponding loss in surface area was not nearly so great as determined by comparison with the product of Example 2.

EXAMPLE 4

A portion of the cobalt Y zeolite described in Example 1 was heated to 1,600°F in a preheated furnace. The time required to bring the sample to calcination temperature was approximately 15 minutes. The temperature of the zeolite during calcination was determined by a thermocouple immersed in the zeolite. The sample was maintained at 1,600°F for 16 hours. The product was completely amorphous. Similarly, the surface area was only 0.3 square meters per gram. Thus the zeolite was not stable to prolonged calcination at 1,600°F.

EXAMPLES 5-9

The fluidized calcination described in Example 4 was repeated at several different conditions of temperature, flow rate and heating rate. The conditions under which these operations were performed and the results are summarized in the table.

EXAMPLE 10

A nickel ammonium Y zeolite containing 5.3 percent NiO and 1.8 percent $Na_2O$ was prepared by exchanging the ammonium zeolite described in Example 1 with $Ni(NO_3)_2 \cdot 6H_2O$. The product was then water washed and dried at 220°F for 16 hours. The product had a crystal size of 2,400 A and a total surface area of 833 square meters per gram.

EXAMPLE 11

The zeolite of Example 10 was heated to 1,500°F in 15 minutes in a preheated muffle furnace and retained at 1500°F for 16 hours. The product retained 77 percent of its original crystallinity, had a crystal size of 2,100 A and a total surface area of 752 square meters per gram.

EXAMPLE 12

The zeolite of Example 10 was heated to 1000°F in 10 minutes in a preheated muffle furnace and retained at that temperature for 15 minutes. The product retained 83 percent of its original crystallinity and had a total surface area of 822 square meters per gram. After cooling to room temperature, this material was heated to 1,530°F in 15 minutes and maintained at that tmperature for an additional 20 minutes. The product retained 65 percent relative crystallinity and had a crystal size of 2400 A and a total surface area of 793 square meters per gram.

EXAMPLES 13-15

The operation of Example 4 was repeated using the nickel-ammonium zeolite of Example 10 under the conditions and with the results summarized in the table.

| Example No. | Temp. | Calciner, lb/hr Air | Calciner, lb/hr Zeolite | Preheater, lb/hr Air | Preheater, lb/hr Water | Heat Rate °F Millisec. Junction | Heat Rate °F Millisec. Coil | Junction Temp.,°F | Time at Temp., MS. | Rel. Cryst., % | S.A., M²/g | Size, A |
|---|---|---|---|---|---|---|---|---|---|---|---|---|
| 1 | 220 | | | | | | | | 16 hr. | 83 | 854 | 2900 |
| 2 | 1500 | | | | | 0.0032 (1) | | | 16 hr. | 73 | 792 | 2900 |
| 3 | 1600 | | | | | 0.0036 (1) | | | 16 hr. | 0 | 0.3 | — |
| 4 | 1555 | 5.7 | 9.9 | 0 | 0 | | 10 | | 84 | 61 | 780 | na |
| 5 | 1575 | 5.7 | 4.0 | 0 | 0.84 | 90 | 11 | 340 | 99 | 48 | 728 | 400 |
| 6 | 1490 | 2.3 | 9.9 | 4.6 | 0 | 240 | 10 | 490 | 78 | na | 868 | na |
| 7 | 1575 | 1.1 | 2.0 | 4.6 | 0 | 500 | 8 | 990 | 160 | 45 | 745 | na |
| 8 | 1625 | 1.1 | 1.0 | 5.2 | 0 | 720 | 6 | 1200 | 153 | 35 | 689 | na |
| 9 | 1615 | 1.1 | 1.7 | 8.0 | 0 | 1090 | 9 | 1230 | 101 | 39 | 819 | 300 |
| 10 | 220 | | | | | | | | 16 hr. | 100 | 833 | 2400 |
| 11 | 1500 | | | | | 0.0032 (1) | | | 16 hr. | 71 | 752 | 2100 |
| 12 | 1530 | | | | | 0.0033 (1) | | | 15 min. | 60 | 793 | 2400 |
| 13 | 1500 | 1.1 | 1.35 | 8.0 | 0 | 1110 | 8 | 1180 | 107 | 92 | 806 | 1200 |
| 14 | 1430 | 0.89 | 1.01 | 8.0 | 0 | 970 | 6 | 1180 | 116 | 88 | 826 | 1000 |
| 15 | 1340 | 0.89 | 0.93 | 3.4 | 4.85 | 500 | 4 | 1200 | 113 | na | na | na |

(1) Average rate after the expulsion of water and ammonia under 800°F.

The estimated rates of temperature increase as the zeolite flowed through the coil are conservative. Heat transfer to the coil was assumed to occur entirely by radiation, and convection was omitted. Transfer inside the tube was calculated from the Nusselt turbulent flow relationship (J. H. Perry, "Chemical Engineers Handbook", 2nd Ed. pp. 973 ff.). Radiation inside the tube was neglected, although it certaily would have been appreciable. Combined interior and exterior coefficients served to calculate the initial and final rates of heat transfer. The log mean value of the initial and final rates determined an overall transfer rate which was used to calculate the temperature increase per millisecond. The gas and zeolite particles were assumed to be in equilibrium. This assumption was based on the observation that solid-gas temperature differences were too small to measure when the particles became smaller than 28/35 mesh. (J. Eichorn and R. R. White, Chem. Engr. Prog. Symposium 48, 11 (1952))

The most rapid heating occurred when the fluidized zeolite stream mixed with the preheated stream of air or steam. The optimum design was two streams impinging at right angles in constant diameter tubing, according to Chilton and Genereaux. (Chilton and Genereaux, Trans. Amer. Inst. Chem. Engr. 25, 102 (1930)). Their experiments at gas velocities between 6 and 90 ft/sec. indicated that complete mixing occurs in a distance equal to two or three diameters provided the velocity of the perpendicular stream is at least 2.5 times the velocity of the straight stream. The perpendicular stream had this relatively high velocity in seven of the calcinations.

I claim:

1. The method of reducing the particle size of a zeolitic refractory oxide having a surface area of at least about 100 square meters per gram including the steps of heating said oxide at an average rate of at least about 0.5°F per millisecond to a temperature of at least about 1,000°F over a temperature differential of at least 500°F sufficient to reduce the average particle size of said oxide.

2. The method of claim 1 wherein said refractory oxide is a crystalline aluminosilicate zeolite having an initial average particle size above about 1000 A and is heated to said temperature at a rate in excess of about 1°F. per millisecond, sufficient to reduce said average particle size to less than about 1000 A.

3. The method of claim 2 wherein said zeolite has an initial surface area of at least about 400 square meters per gram, said temperature differential is at least about 100°F., said zeolite is heated at a rate of at least about 5°F. per millisecond by mixing a fluidized stream of said zeolite and a fluidizing gas with a preheated fluid stream having a temperature above about 1000°F., and said conditions of heating rate and temperature are correlated to produce a product having an average particle size of less than about 500 A diameter and a surface area of at least about 400 square meters per gram.

4. The method of claim 3 wherein said zeolite has a faujasite crystal structure, a silica-to-alumina ratio of at least about 3, a sodium content of less than about 3 weight percent $Na_2O$ and at least one other cation selected from hydrogen, polyvalent metal ions and hydrogen precursor ions convertible to hydrogen at elevated temperatures, and said zeolite is heated to a temperature of at least about 1400°F.

5. The method of claim 2 wherein said oxide contains at least about 3 weight percent volatile matter vaporizable at said temperature above 1,000°F.

6. The method of claim 5 wherein said zeolite is oxide comprises an ammonium exchanged faujasite zeolite containing less than 3 weight percent $Na_2O$.

* * * * *

UNITED STATES PATENT OFFICE
CERTIFICATE OF CORRECTION

Patent No. 3,864,282     Dated February 4, 1975

Inventor(s) Dean Arthur Young

It is certified that error appears in the above-identified patent and that said Letters Patent are hereby corrected as shown below:

Column 8, lines 27-28 (Claim 6) delete "oxide comprises".

Signed and sealed this 8th day of April 1975.

(SEAL)
Attest:

RUTH C. MASON
Attesting Officer

C. MARSHALL DANN
Commissioner of Patents
and Trademarks